United States Patent
Kitaya et al.

(10) Patent No.: US 8,704,894 B2
(45) Date of Patent: Apr. 22, 2014

(54) DISPLAY DEVICE, TELEVISION RECEIVER, AND METHOD FOR STARTING UP DISPLAY DEVICE

(75) Inventors: Akio Kitaya, Osaka (JP); Tohru Horii, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 78 days.

(21) Appl. No.: 13/382,482

(22) PCT Filed: Jul. 2, 2010

(86) PCT No.: PCT/JP2010/061322
§ 371 (c)(1),
(2), (4) Date: Jan. 5, 2012

(87) PCT Pub. No.: WO2011/004768
PCT Pub. Date: Jan. 13, 2011

(65) Prior Publication Data
US 2012/0105650 A1    May 3, 2012

(30) Foreign Application Priority Data

Jul. 6, 2009   (JP) ................................. 2009-159682
Jul. 1, 2010   (JP) ................................. 2010-151386

(51) Int. Cl.
*H04N 17/00*   (2006.01)
*H04N 17/02*   (2006.01)
*G09G 5/00*    (2006.01)
*G06F 3/038*   (2013.01)

(52) U.S. Cl.
USPC .................... 348/177; 348/E17.006; 345/204

(58) Field of Classification Search
None
See application file for complete search history.

(56) References Cited

U.S. PATENT DOCUMENTS

| | | | |
|---|---|---|---|
| 2003/0016189 A1 | 1/2003 | Abe et al. | |
| 2007/0258011 A1 | 11/2007 | Tachikawa | |
| 2008/0068506 A1 | 3/2008 | Urisu | |
| 2008/0316190 A1 | 12/2008 | Okabe | |

FOREIGN PATENT DOCUMENTS

| | | |
|---|---|---|
| EP | 1276093 A2 | 1/2003 |
| JP | 6-103238 A | 4/1994 |
| JP | 6-149550 A | 5/1994 |
| JP | 9-297725 A | 11/1997 |
| JP | 2007-15223 | 1/2007 |
| JP | 2009-64210 A | 3/2009 |
| RU | 2007117094 A | 11/2008 |
| RU | 2007134740 A | 3/2009 |

OTHER PUBLICATIONS

Supplementary European Search Report for corresponding application EP 10 79 7079.0, dated Feb. 1, 2013.

*Primary Examiner* — Jefferey Harold
*Assistant Examiner* — Sean Haiem
(74) *Attorney, Agent, or Firm* — Birch, Stewart, Kolasch & Birch, LLP

(57) ABSTRACT

Disclosed is a display device provided with a circuit board applicable to various models, wherein the operations of a system microcomputer on the circuit board can be switched without using a physical connector. The display device is provided with: a main board applicable to various models; and a TV microcomputer, which is provided on the main board and stores the set value data of each of the models. The main board is provided with: an external memory I/F which has external memory said external memory storing the model identifying information of the display device stored. The TV microcomputer specifies the set value data of the display device on the basis of the model identifying information of the display device, said model identifying information having been read out from the external memory, and the TV microcomputer switches the operation on the basis of the specified set value data.

20 Claims, 8 Drawing Sheets (A)

(B)

DISPLAY DEVICE, TELEVISION RECEIVER, AND METHOD FOR STARTING UP DISPLAY DEVICE

TECHNICAL FIELD

The present invention relates to a display device, a television receiver, and a method for starting up the display device, and, more particularly, to a display device, a television receiver, and a method for starting up the display device that are equipped with a circuit board commonalized for various models and are capable of switching the operations of a system microcomputer disposed on the circuit board depending on the model.

BACKGROUND ART

Conventionally, a display device of a television apparatus, etc., is designed so that one circuit board can be used commonly for various models, for the purpose of cost reduction, etc. For example, a main board with a system microcomputer mounted thereon can possibly connect with different liquid crystal modules. Since a starting sequence can possibly differ from one liquid crystal module to another, it is necessary to switch the starting sequence on the part of the main board (system microcomputer) before a power source of the liquid crystal module is started up. Since it is possible that an input and an output of a control port are exchanged depending on the liquid crystal module, it is necessary to change the input and the output of the control port on the part of the main board before the power source of the liquid crystal module is started up.

It is also conceivable to use one main board by switching product specification. For example, to be capable of accommodating the model having a four-port video input and the model having a three-port video input, the four-port video input can possibly be pre-assembled. In such a case, it is necessary to switch the operation of the system microcomputer according to the number of ports of the video input and set an ODS (On Screen Display) display, etc.

Thus, in the case of using the circuit board including the system microcomputer commonly for various models, it is necessary to switch the operation on the part of the system microcomputer according to the starting sequence, the product specification, etc. This operation switching processing is performed when the liquid crystal module is connected to the main board in a manufacturing process or when the main board is exchanged in repairs on a customer's premise, etc. An operation switching method will be described of the system microcomputer in the conventional television apparatus with reference to FIGS. 7 and 8.

FIG. 7 is a block diagram of a main part configuration for description of the operation switching method of the system microcomputer in the conventional display device and reference numeral 100 in the drawing denotes the display device. This display device 100 is equipped with a controller 101 that outputs a timing pulse necessary for driving/displaying of a liquid crystal panel (not shown), a main board 102 that controls the operation of the display device 100, a power source unit 103 that supplies power to each component, and an inverter 104 that drives a backlight of the liquid crystal panel. The main board 102 is equipped with a connector 102a shown in FIG. 6, a system microcomputer 102b, and a memory 102c that stores various adjustment values, user setting values, etc.

FIG. 8 is a diagram of an appearance configuration of the connector 102a shown in FIG. 7. FIG. 8(A) is a diagram of the connector 102a as viewed from the top and FIG. 8(B) is a diagram of the connector 102a as viewed at an angle. To cause the system microcomputer 102b to perform different operations, the connector 102a has eight ports #1 to #8 pre-assigned thereto and by switching high/low of each port, the operation of the system microcomputer 102b is switched. Specifically, a plug 105 shown in Fig. (B) is inserted into any of the ports #1 to #8 with which the connector 102a is equipped. In this example, the plug 105 is inserted into the location of the port #6. The system microcomputer, reading bit assignment at this moment, switches the operation accordingly.

Many of the television apparatuses currently on the market pre-store multiple pieces of setting value data (e.g., sound frequency characteristic table, temperature correction table, etc.) that differ from one model to another and the system microcomputer of the television apparatus, given model identification information (e.g., model number and screen size) by the connector and the plug, can identify its own setting value data out of the multiple pieces of setting value data. The system microcomputer can switch the operation based on the identified setting value data.

In this connection, a technology is known of updating programs of firmware, etc., by use of a memory card. For example, an image forming device described in Patent Reference Document 1, equipped with a model information memory portion that memorizes model information of the device, an access portion that accesses the memory card in which various programs are pre-recorded for various different models of the device, a distinguishing portion that distinguishes the program suitable for the device out of the various programs recorded in this memory card, based on the model information of the device, and a transfer portion that transfers this distinguished program from the memory card to a program storage portion, is designed to be capable of efficiently updating the programs with simple configuration.

PRIOR ART DOCUMENTS

Patent Document

Patent Document 1: Japanese Laid-Open Patent Publication No. 2007-15223

SUMMARY OF THE INVENTION

Problem to be Solved by the Invention

In the case of switching the operation of the system microcomputer of the television apparatus through the method described in FIGS. 7 and 8, since several ports are pre-assigned to the system microcomputer, there is a problem that there is an increase in the number of terminals as a whole. Since a physical connector is arranged, there is a problem that extra parts costs are incurred for such a purpose.

In contrast, it is conceivable to give the model identification information (model number and screen size) to the system microcomputer by use of an external memory in place of the connector. The technology described in Patent Reference Document 1, which, however, uses the external memory simply for updating the programs of firmware, etc., of the image forming device and is not intended to switch the operation of the system microcomputer in the television apparatus by use of the external memory, cannot solve the above problem.

As to a method of switching the function of the product, while there is a method of manually changing the setting using a remote control for adjustment, this method is premised on the use of the remote control and the display on the screen, which makes it impossible to make a basic setting for the screen display, etc. Contents of the setting can include temperature setting to the function to be limited by the temperature inside the device and such a setting for protection of the device must be completed before main functions of the device are started. For example, in the case of the television apparatus, such a setting must be made before the screen displaying, audio outputting, and a receiving operation by a tuner.

The present invention was conceived in light of the situation described above and the object thereof is to be capable of switching the operation of a system microcomputer disposed in a circuit board commonalized for various models, without using a physical connector, in a display device equipped with the circuit board.

Means for Solving the Problem

To solve the problems, a first technical means of the present invention is a display device comprising: a circuit board commonalized for various models; and a system microcomputer disposed on the circuit board and storing setting value data of each of the various models, wherein the circuit board comprises: an external memory interface to which an external memory storing model identification information of the display device is detachably attached; and a model identification information reading portion that reads out the model identification information of the display device from the external memory, and wherein the system microcomputer, based on the model identification information of the display device read out from the external memory, identifies the setting value data of the display device out of the setting value data of the various models and switches the operation by the identified setting value data.

A second technical means of the present invention is the display device as defined in the first technical means, further comprising: a memory portion for storing the model identification information of the display device read out from the external memory.

A third technical means of the present invention is the display device as defined in the second technical means, wherein the memory portion further stores the setting value data of the display device identified out of the setting value data of the various models.

A fourth technical means of the present invention is the display device as defined in the first technical means, further comprising: a power supplying portion that supplies power only to the circuit board at the time of starting the display device, wherein the power supplying portion supplies power to circuit boards other than the circuit board after switching the operation of the system microcomputer.

A fifth technical means of the present invention is the display device as defined in the second technical means, wherein the model identification information reading portion, at the time of starting thereof, determines if the model identification information of the display device is stored in the external memory, and if it is determined that the model identification information of the display device is stored in the external memory, writes the model identification information of the display device read out from the external memory over the model identification information of the display device stored in the memory portion.

A sixth technical means of the present invention is the display device as defined in the second technical means, wherein the system microcomputer, at the time of starting thereof, determines if the model identification information of the display device is stored in the memory portion, and if it is determined that the model identification information of the display device is not stored in the memory portion, the model identification information reading portion reads out the model identification information of the display device from the external memory.

A seventh technical means of the present invention is the display device as defined in the first technical means, wherein the model identification information of the display device includes the model number and the screen size of the display device.

An eighth technical means of the present invention is the display device as defined in the third technical means, wherein in the case where the external memory stores a command instructing to copy the setting value data of the memory portion to the external memory, the system microcomputer copies the setting value data of the memory portion to the external memory according to the command and thereafter stops its operation.

A ninth technical means of the present invention is the display device as defined in the third technical means, wherein in the case where the external memory stores the setting value data, the system microcomputer sets the operation by the setting value data of the memory portion and the setting value data of the external memory and thereafter writes the setting value data of the external memory in the memory portion.

A tenth technical means of the present invention is the display device as defined in the ninth technical means, wherein in the case where the external memory stores a command to prohibit writing the setting value data of the external memory in the memory portion, the system microcomputer prohibits writing in the memory portion according to the command.

An eleventh technical means of the present invention is the display device as defined in the ninth technical means, wherein the setting value data of the memory portion and the setting value data of the external memory differ.

A twelfth technical means of the present invention is a television receiver comprising the display device as defined in the first technical means.

A thirteenth technical means of the present invention is a starting method of a display device comprising a circuit board commonalized for various models, a system microcomputer disposed on the circuit board and storing setting value data of each of the various models, and an external memory interface disposed on the circuit board, the method comprising the steps of: supplying power only to the circuit board at the time of starting the display device; reading out model identification information of the display device from an external memory attached to the external memory interface; identifying the setting value data of the display device out of the setting value data of the various models, based on the read-out model identification information of the display device, and switching the operation of the system microcomputer by the identified setting value data; and supplying power to circuit boards other than the circuit board after switching the operation of the system microcomputer.

Effect of the Invention

According to the present invention, in the display device equipped with the circuit board commonalized for various models, the operation of the system microcomputer disposed in the circuit board is switched by a software method using the external memory so that the physical connector can be eliminated, suppressing the increase in the number of terminals and reducing the parts costs.

MODE FOR CARRYING OUT THE INVENTION

Preferred embodiments of a display device, a television receiver, and a starting method of the display device of the present invention will now be described with reference to the attached drawings.

Figure 1:
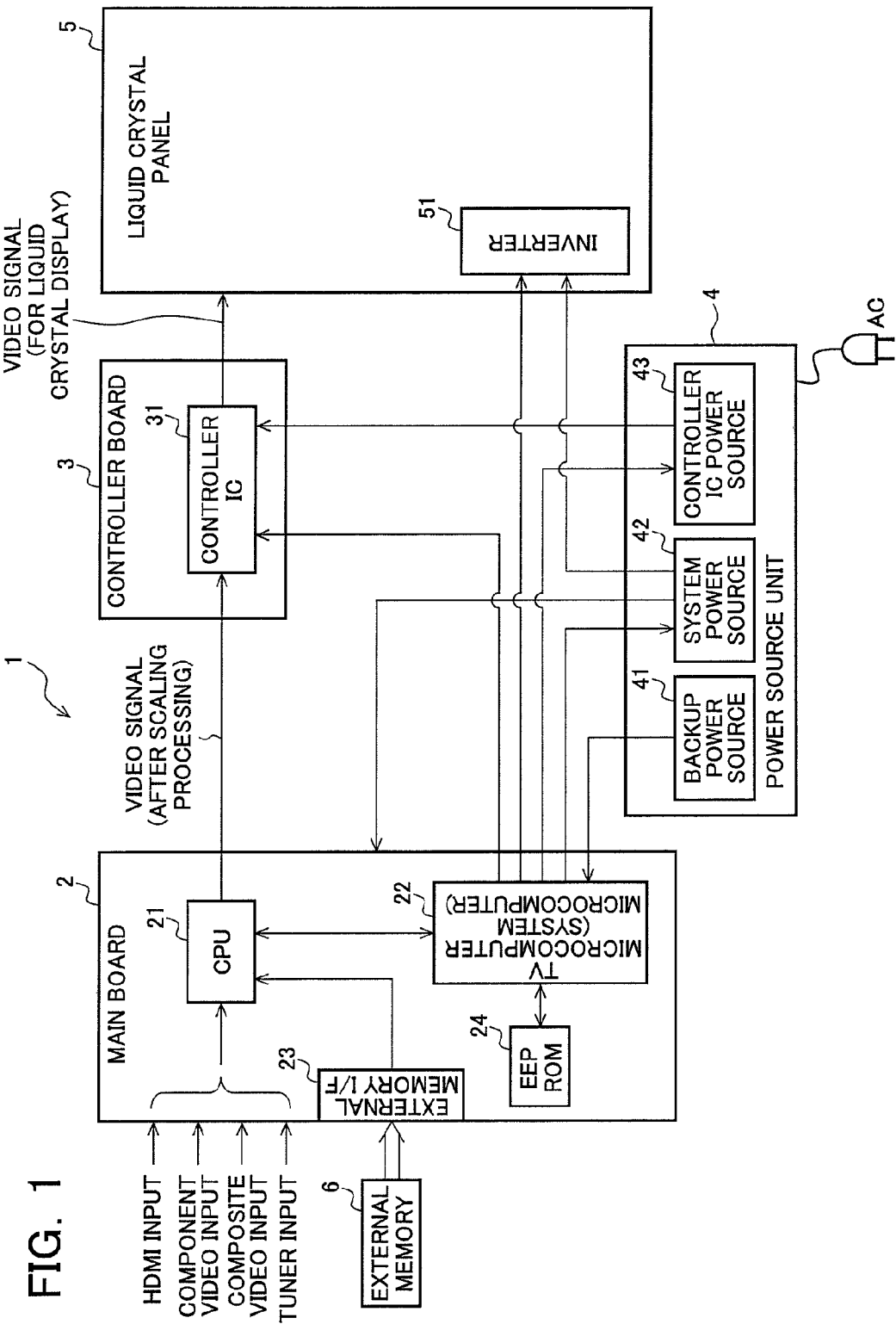
FIG. 1 is a block diagram of a main part configuration example of a display device according to one embodiment of the present invention.

FIG. 1 is a block diagram of a main part configuration example of the display device according to one embodiment of the present invention. Reference numeral 1 in the drawing denotes the display device. The display device 1 is mainly composed of a main board 2, a controller board 3, a power source unit 4, and a liquid crystal panel 5. The main board 2 is configured to enable an external memory 6 of, for example, a USB (Universal Serial Bus) memory, etc., to be detachably attached thereto. Needless to say, the present invention may be embodied as the television receiver equipped with the display device 1.

The display device 1 and the external memory 6 may be configured to be connected by radio of Bluetooth, etc. The external memory 6 may be, besides the USB memory, a memory card such as an SD card or may be a recording medium such as an RF (Radio Frequency) tag. The USB memory, which is a general-use recording medium, is easy to procure. The SD card is small in medium size and is easy to handle. The radio connection, which is non-contact, does not require a directly connecting work at the production process and can achieve enhancement of work efficiency. The medium such as the RF tag has, besides the advantage of the radio, the ease of setting up since the medium can be made extremely small.

The external memory 6 pre-stores, for example, the model number specific to the display device 1 and screen size information indicative of the inch size of the screen as the model identification information to identify the display device 1. This model identification information, which is described in a predetermined data format (identifier), can be identified even if it is stored together with other data in the external memory 6.

The main board 2 is equipped with a main CPU 21 that performs various video processing of an HDMI (High Definition Multimedia Interface) input, a component video input, a composite video input, a tuner input, etc., a TV microcomputer 22 corresponding to a system microcomputer that accepts a remote control signal in a stand-by state of the display device 1, an external memory interface (external memory I/F) 23 for detachable attachment of the external memory 6, and an EEPROM (Electrically Erasable and Programmable ROM) 24 as one example of a non-volatile memory storing various adjustment values, user setting values, etc.

The controller board 3 is equipped with a controller IC 31, which outputs a timing pulse necessary for driving and displaying of the liquid crystal panel 5 to the liquid crystal panel 5. A pulse output signal is composed of a horizontal output and a vertical output and its timing is designed to meet pulse specifications (kind, number of pixels, etc.).

The power source unit 4 is equipped with an AC power source and is composed of a backup power source 41 that supplies power to the TV microcomputer 22, a system power source 42 that supplies power to the main board 22 and an inverter 51, and a controller IC power source 43 that supplies power to the controller IC 31.

The liquid crystal panel 5 is composed of a liquid crystal layer sandwiched by two pieces of glass substrate with polarizing plate, the two polarizing plates having a crossed Nicol relationship, and behind a backlight device (not shown), the inverter 51 is disposed to drive a fluorescent tube (e.g., CCFL: Cold Cathode Fluorescent Lamp) or an LED (Light Emitting Diode) as a backlight light source. The liquid crystal panel 5 feeds a video signal that has undergone video signal processing as a predetermined gradation voltage for each pixel according to a clock signal of the liquid crystal panel 5 and applies image display processing by progressive scanning on the screen so that the image corresponding the video signal will be displayed. The inverter 51, as a booster circuit to supply power to the backlight light source, is composed of an inverter transformer, etc. As to the inverter transformer, there is, for example, a winding-type inverter transformer that, by the effect of electromagnetic induction of two coils, transforms the voltage based on the ratio of the number of turns of one coil to the number of turns of the other coil.

The principal feature of the present invention lies in the capability of switching the operation of the system microcomputer disposed in a circuit board commonalized for various models, without using a physical connector, in the display device equipped with the circuit board. To be configured for such a purpose, the display device 1 is equipped with the main board 2 corresponding to the circuit board commonalized for various models and the TV microcomputer 22 corresponding to the system microcomputer that is disposed on the main board 2 and stores the setting value data of each of the various models.

The main board 3 is equipped with the external memory I/F 23 that enables the external memory 6 storing the model identification information of the display device 1 to be detachably attached thereto and the CPU 21 corresponding to a model identification information reading-out portion that reads out the model identification information of the display device 1 from the external memory 6. The TV microcomputer 22 identifies the setting value data of the display device 1 out of the setting value data of the various models, based on the model identification information of the display device 1 read out from the external memory 6 and switches the operation according to the identified setting value data.

The display device 1 is equipped with the power source unit 4 corresponding to a power supplying portion that supplies power only to the main board 2 at the time of starting the display device 1. This power source unit 4, after the switching of the operation of the TV microcomputer 2, supplies power to circuit boards (controller board 3 and liquid crystal panel 5) other than the main board 2.

The TV microcomputer 22 has a memory inside itself and the memory stores multiple pieces of setting value data that differ from one model to another. The setting value data includes a sound frequency characteristic table, a temperature correction table, a voltage adjustment curve of the backlight light source, product specification information (such as number of HDMI terminals), destination information (for Japan, for U.S., etc.), etc., for each model (model number and screen size). For example, when the display device 1 is given as model A and the main board 2 is given as a board common for four models of A to D, the TV microcomputer 22 is assumed to store the setting value data for each of these four models of A to D.

The main setting value data will now be described briefly. Since a difference of the speaker from one model to another and a difference of the distance between the speakers due to a difference of the screen size change the quality of the sound, the sound frequency characteristic table is intended for changing the setting of an audio DSP (Digital Signal Processor). Specifically, to cause the output characteristics of the speakers to match, equalizing is applied to the frequency to be adjusted so that the quality of the sound will be the same even with different speaker systems.

Since a difference of the screen size results in a difference in the temperature inside the apparatus, the temperature correction table is intended for protecting each component so that it will not reach its upper-limit temperature. Specifically, using a temperature measuring component arranged on the main board, etc., the temperature of the board is measured and a coefficient is set based on a correlation with the temperature of each component pre-measured for each screen size and the value against which to protect the component is calculated.

Since the transmittance of the liquid crystal differs from one liquid crystal module (screen size) to another, the voltage adjustment curve of the backlight light source is intended for setting a lighting control value to meet the product specifications. Specifically, the maximum value of the lighting control is the maximum settable value and the minimum value of the setting value to be set by a user menu is designed to match a contrast value of the product specifications and this minimum value is formatted as a table. Even if the backlight light source is the fluorescent tube or the LED, the minimum value is set in the same manner.

One external memory 6 stores one piece of model identification information. In this example, it is assumed that the external memory 6 stores the model identification information (model number and screen size) of the display device 1. The CPU 21, connected to the external memory I/F 23, reads out the model identification information from the external memory 6 at the time of initially starting the display device 1, etc. At that time, since the model identification information is described in a predetermined data format (extension), the CPU 21 can determine whether the data stored in the external memory 6 is the model identification information.

The CPU 21 transmits the model identification information read in from the external memory 6 to the TV microcomputer 22. The TV microcomputer 22, based on the model identification information, identifies the setting value data of the display device 1 out of the multiple pieces of setting value data in the memory. The TV microcomputer 22 switches the operation based on the identified setting value data and stores the acquired model identification information in the EEPROM 24 as one example of the memory portion.

Thus, according to the above configuration, in the display device equipped with the circuit board commonalized for various models, the operation of the system microcomputer disposed in the circuit board is switched by the software method using the external memory so that the physical connector can be eliminated, suppressing the increase in the number of terminals and reducing the parts costs.

Figure 2:
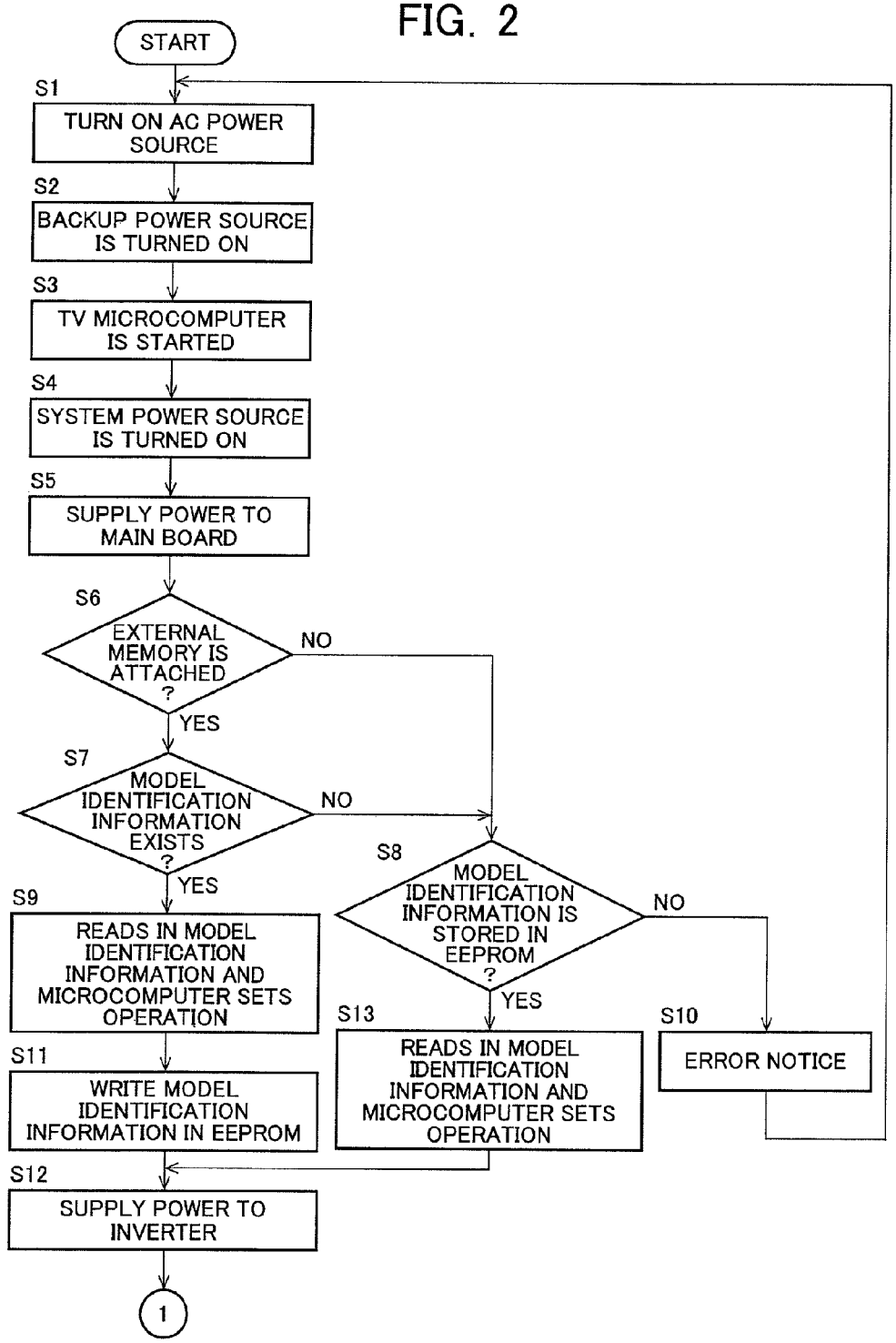
FIG. 2 is a flowchart for description of one example of a starting sequence of the display device according to the present invention.

FIG. 2 is a flowchart for description of one example of a starting sequence of the display device 1 according to the present invention. It is assumed that this starting sequence is executed when the liquid crystal module is connected at the manufacturing process or the board is exchanged for repairs at the customer's premise, etc., as described above.

In this example, the CPU 21, at the time of starting the CPU 21, determines if the model identification information of the display device 1 is stored in the external memory 1. If it is determined that the model identification information of the display device 1 is stored in the external memory 6, then the CPU 21 stores the model identification information of the display device 1 read out from the external memory 6 in the EEPROM 24. That is to say, since, when the external memory 6 is attached, the external memory 6 takes precedence over, the model identification information stored in the EEPROM 24, if any, is overwritten with the model identification information of the display device 1 read out from the external memory 6.

In FIG. 2, in the display device 1, when the AC power source of the power source unit 4 is turned on (step S1), the backup power source 41 of the power source unit 4 is turned on (step S2) and further, power is supplied from the backup power source 41 to the TV microcomputer 22, and the TV microcomputer 22 starts up (step S3). Upon instruction from the TV microcomputer 22, the system power source 42 of the power source unit 4 is turned on (step S4).

Then, power is supplied from the system power source 42 to the main board 2, and the main board 2 starts up (step S5). The CPU 21 of the main board 2 determines if the external memory 6 is attached to the external memory I/F 23 (step S6) and if the CPU 21 determines that the external memory 6 is attached (in the case of YES), then the CPU 21 determines if the model identification information of the display device 1 is stored in the external memory 6 (step S7). At step S6, if it is determined that the external memory 6 is not attached (in the case of NO), then the TV microcomputer 22 determines if the model identification information of the display device 1 is stored in the EEPROM 24 (step S8).

At step S7, if the CPU 21 determines that the model identification information of the display device 1 is stored in the external memory 6 (in the case of YES), then the CPU 21 reads in the model identification information from the external memory 6 and transmits it to the TV microcomputer 22. The TV microcomputer 22 identifies the setting value data corresponding to this model identification information out of the multiple pieces of setting value data stored in the internal memory of the TV microcomputer 22 and sets the operation based on the identified setting value data (step S9). At step S7, if the CPU 21 determines that the model identification information of the display device 1 is not stored in the external memory 6 (in the case of NO), then the flow goes to step S8. The identified setting value data may be stored in the EEPROM 24.

After setting the operation at step S9, the TV microcomputer 22 writes and stores the model identification information acquired from the external memory 6 in the EEPROM 24

(step S11). The order of step S9 and step S11 may be reversed. In this case, after writing and storing the model identification information acquired from the external memory 6 in the EEPROM 24, the model identification information is read out from the EEPROM 24 and the operation is set based on the setting value data corresponding to this model identification information.

In the case of this example, when it is determined that the model identification information of the display device 1 is stored in the external memory 6, the external memory 6 takes precedence over. Therefore, even if the model identification information of the display device 1 is stored in the EEPROM 24, the model identification information of the display device 1 read out from the external memory 6 overwrites the model identification information of the display device 1 stored in the EEPROM 24. Upon instruction from the TV microcomputer 22, power is supplied from the system power source 42 to the inverter 51, and the inverter 51 starts up (step S12).

At step S8, if the TV microcomputer 22 determines that the model identification information is stored in the EEPROM 24 (in the case of YES), then the TV microcomputer 22 reads in the model identification information from the EEPROM 24 and sets the operation based on the setting value data corresponding to this model identification information (step S13) and the flow goes to step S12. At step S8, if the TV microcomputer 22 determines that the model identification information is not stored in the EEPROM 24 (in the case of NO), then the TV microcomputer 22 gives an error notice by generating a beep sound, etc., (step S10). This error notice is executable by connecting a sound source of the beep sound to the main board 2 so that power can be supplied to the sound source. Hereinafter, the sequence goes to the flow shown in FIG. 4.

When the error notice is given at step S10, a worker (plant worker or serviceman, etc.) attaches the external memory 6 storing the model identification information of the display device 1 to the display device 1 and repeats the processing starting with step S1. Since one external memory 6 stores one piece of model identification information as described above, it is preferable to arrange so that the worker can identify which external memory stores the model identification information of which model.

Figure 3:
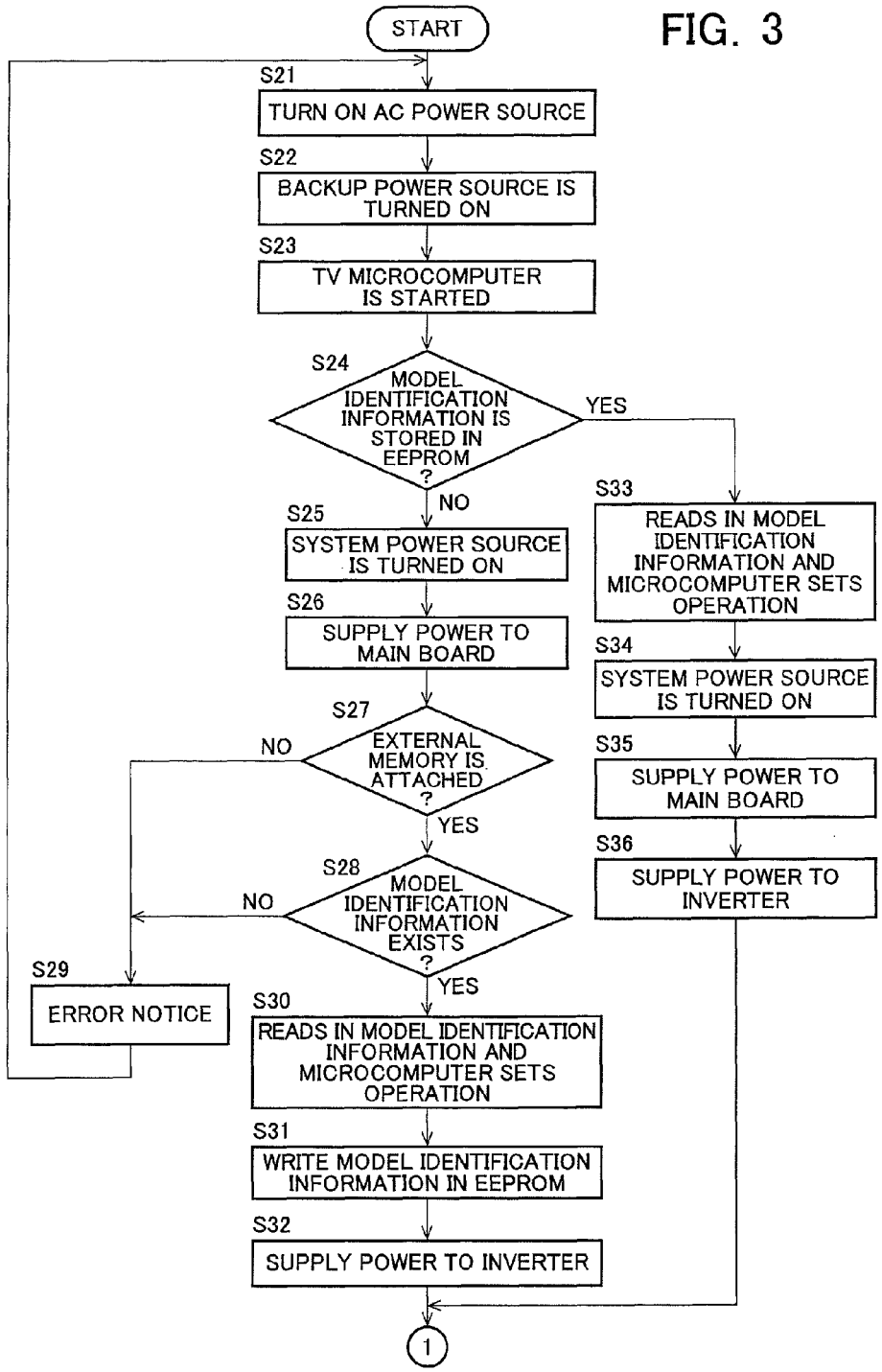
FIG. 3 is a flowchart for description of other example of the starting sequence of the display device according to the present invention.

FIG. 3 is a flowchart for description of other example of the starting sequence of the display device 1 according to the present invention. It is assumed that this starting sequence, like the sequence described in FIG. 2, is executed when the liquid crystal module is connected at the manufacturing process or the board is exchanged for repairs at the customer's premise, etc.

In this example, since the model identification information is read from the external memory 6 at the time of the initial starting and the model identification information is read from the EEPROM in the second and subsequent starting, the second and subsequent starting is sped up and can eliminate the use of the external memory 6. When it is desired to write the model identification information of the external memory 6 again in the EEPROM 24, such a desire can be met by firstly removing the model identification information of the EEPROM 24 and then performing writing processing.

That is to say, TV microcomputer 22, at the time of the starting of the TV microcomputer 22, determines if the model identification information of the display device 1 is stored in the EEPROM 24. If the TV microcomputer 22 determines that the model identification information of the display device 1 is not stored in the EEPROM 24 (at the time of the initial starting), then the CPU 21 reads out the model identification information of the display device 1 from the external memory 6.

In FIG. 3, in the display device 1, when the AC power source of the power source unit 4 is turned on (step S21), the backup power source 41 of the power source unit 4 is turned on (step S22) and further, power is supplied from the backup power source 41 to the TV microcomputer 22, and the TV microcomputer 22 starts up (step S23).

TV microcomputer 22 determines if the model identification information of the display device 1 is stored in the EEPROM 24 (step S24) and if it is determined that the model identification information is not stored in the EEPROM 24 (in the case of NO), then, upon instruction from the TV microcomputer 22, the system power source 42 of the power source unit 4 is turned on (step S25). At step S24, if it is determined that the model identification information is stored in the EEPROM 24 (in the case of YES), then the flow goes to step S33.

Then, power is supplied from the system power source 42 to the main board 2 and the main board 2 starts up (step S26). The CPU 21 of the main board 2 determines if the external memory 6 is attached to the external memory I/F 23 (step S27) and if the CPU 21 determines that the external memory 6 is attached (in the case of YES), then the CPU 21 determines if the model identification information of the display device 1 is stored in the external memory 6 (step S28). At step S27, if it is determined that the external memory 6 is not attached (in the case of NO), then the error notice is given by generating the beep sound, etc., (step S29). As described above, the error notice is executable by connecting the sound source of the beep sound to the main board 2 so that power can be supplied to the sound source.

At step S28, if the CPU 21 determines that the model identification information is stored in the external memory 6 (in the case of YES), then the CPU 21 reads in the model identification information from the external memory 6 and transmits it to the TV microcomputer 22. The TV microcomputer 22 identifies the setting value data corresponding to this model identification information out of the multiple pieces of setting value data stored in the internal memory of the TV microcomputer 22 and sets the operation based on the identified setting value data (step S30). At step S28, if the CPU 21 determines that the model identification information is not stored in the external memory 6 (in the case of NO), then the flow goes to step S29 and the error notice is given by generating the beep sound, etc.

When the error notice is given at step S29, the worker (plant worker or serviceman, etc.) attaches the external memory 6 storing the model identification information of the display device 1 to the display device 1 and repeats the processing starting with step S21.

After setting the operation at step S30, the TV microcomputer 22 writes and stores the model identification information acquired from the external memory 6 in the EEPROM 24 (step S31). Upon instruction from the TV microcomputer 22, power is supplied from the system power source 42 to the inverter 51, and the inverter 51 starts up (step S32).

At step S24, if the TV microcomputer 22 determines that the model identification information is stored in the EEPROM 24 (in the case of YES), then the TV microcomputer 22 reads in the model identification information from the EEPROM 24 and sets the operation based on the setting value data corresponding to this model identification information (step S33). When, upon instruction from the TV microcomputer 22, the system power source 42 is turned on (step S34), power is supplied from the system power source 42 to the main board 2 (step S35) and further, power is supplied from the system power source 42 to the inverter 51 (step S36). Hereinafter, the sequence goes to the flow shown in FIG. 4.

Figure 4:
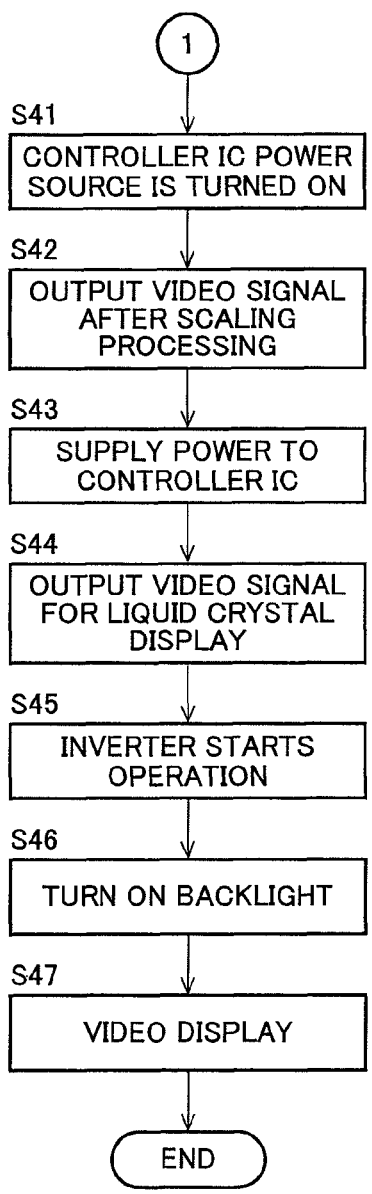
FIG. 4 is a flowchart for description of a continuation of the starting sequence of the display device shown in FIG. 2 or 3.

FIG. 4 is a flowchart for description of a continuation of the starting sequence of the display device 1 shown in FIG. 2 or 3. When, upon instruction from the TV microcomputer 22, the controller IC power source 43 is turned on (step S41), the CPU 21 outputs a video signal after scaling processing to the controller board 3 (step S42). Then, power is supplied from the controller IC power source 43 to the controller IC 31 (step S43) and the controller IC 31, upon instruction from the TV microcomputer 22, outputs a video signal for liquid crystal display to the liquid crystal panel 5 (step S44).

Then, upon instruction from the TV microcomputer 22, the inverter 51 starts its operation (step S45), turns on the backlight light source (step S46), and causes the liquid crystal panel 5 to display the video signal for liquid crystal display output from the controller IC 31 (step S47).

Figure 5:
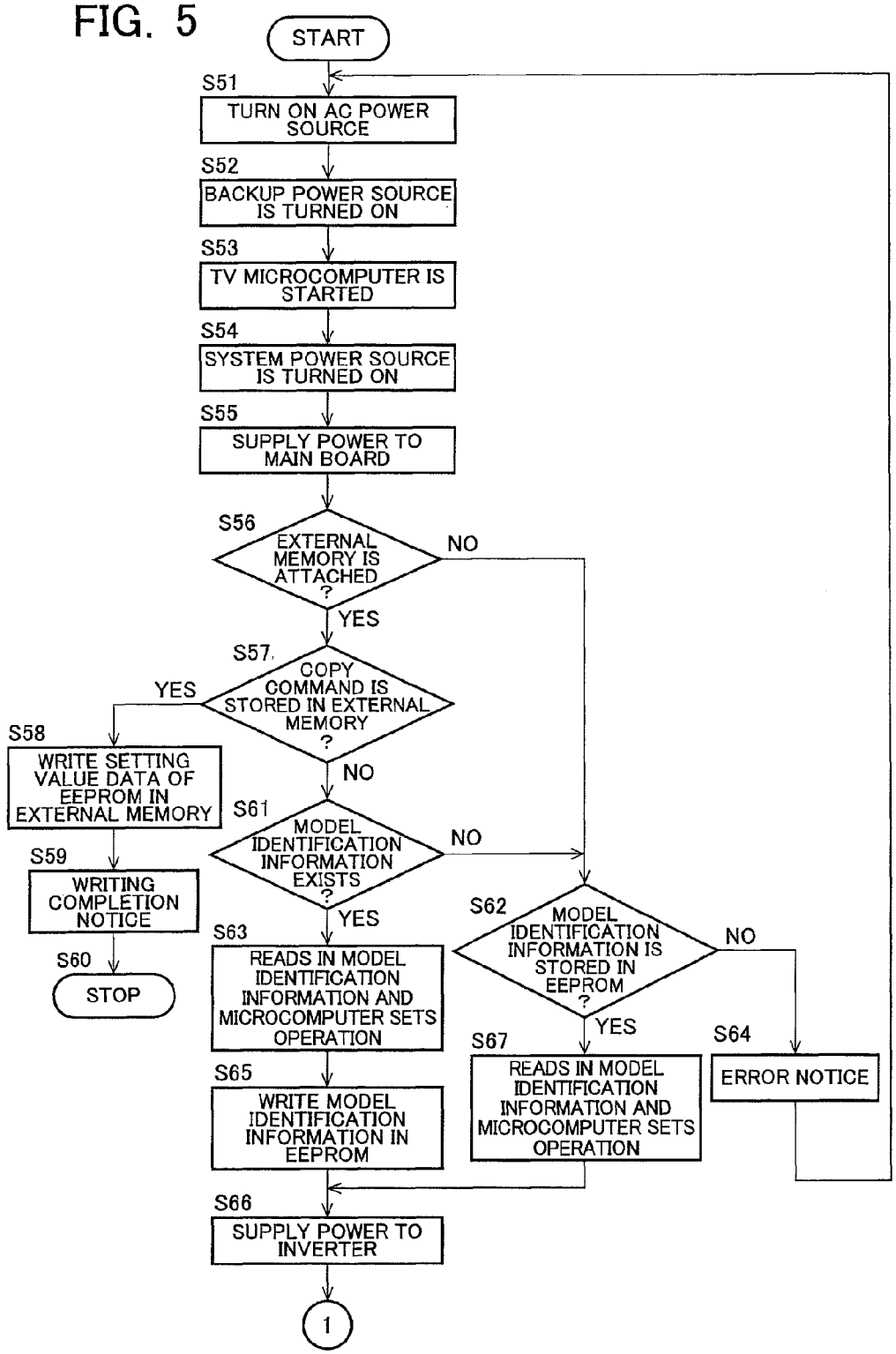
FIG. 5 is a flowchart for description of other example of the starting sequence of the display device according to the present invention.

FIG. 5 is a flowchart for description of other example of the starting sequence of the display device 1 according to the present invention. This example will be described on the premise that the setting value data of the display device 1 identified by the flow of FIG. 2 is stored in the EEPROM 24. In the case of this example, if the external memory 6 stores a command to copy the setting value data of the EEPROM 24 to the external memory 6, then the TV microcomputer 22 copies the setting value data of the EEPROM 24 to the external memory 6 according to this command and thereafter stops its operation. Since the processing of steps S51 to S56 of this example is the same as the processing of steps S1 to S6 of FIG. 2, the description thereof is omitted.

At step S56, if the CPU 21 of the display device 1 determines that the external memory 6 is attached (in the case of YES), then the CPU 21 determines if the command to copy is stored in the external memory 6 (step S57). If the CPU 21 determines that the command to copy is stored in the external memory 6 (in the case of YES), then the TV microcomputer 22 and the CPU 21 write the setting value data stored in the EEPROM 24 in the external memory 6 (step S58). At step S57, if the CPU 21 determines that the command to copy is not stored in the external memory 6 (in the case of NO), then the flow goes to step S61. Since the processing of steps S61 to S67 is the same as the processing of steps S7 to S13 of FIG. 2, the description thereof is omitted.

After step S58, TV microcomputer 22 gives a writing completion notice (step S59) and immediately comes to a stopped state (step S60). Such an arrangement makes it possible to confirm the setting value data of the EEPROM 24 written in the external memory 6 before the user starts the display device 1, for example, in the case of malfunction of the display device 1, etc. This confirmation work can easily be performed by connecting the external memory 6 to, for example, a PC (Personal Computer). If any inappropriate setting value in the data of the EEPROM 24 is changed by the user, the malfunction of the display device 1 can be rectified.

Figure 6:
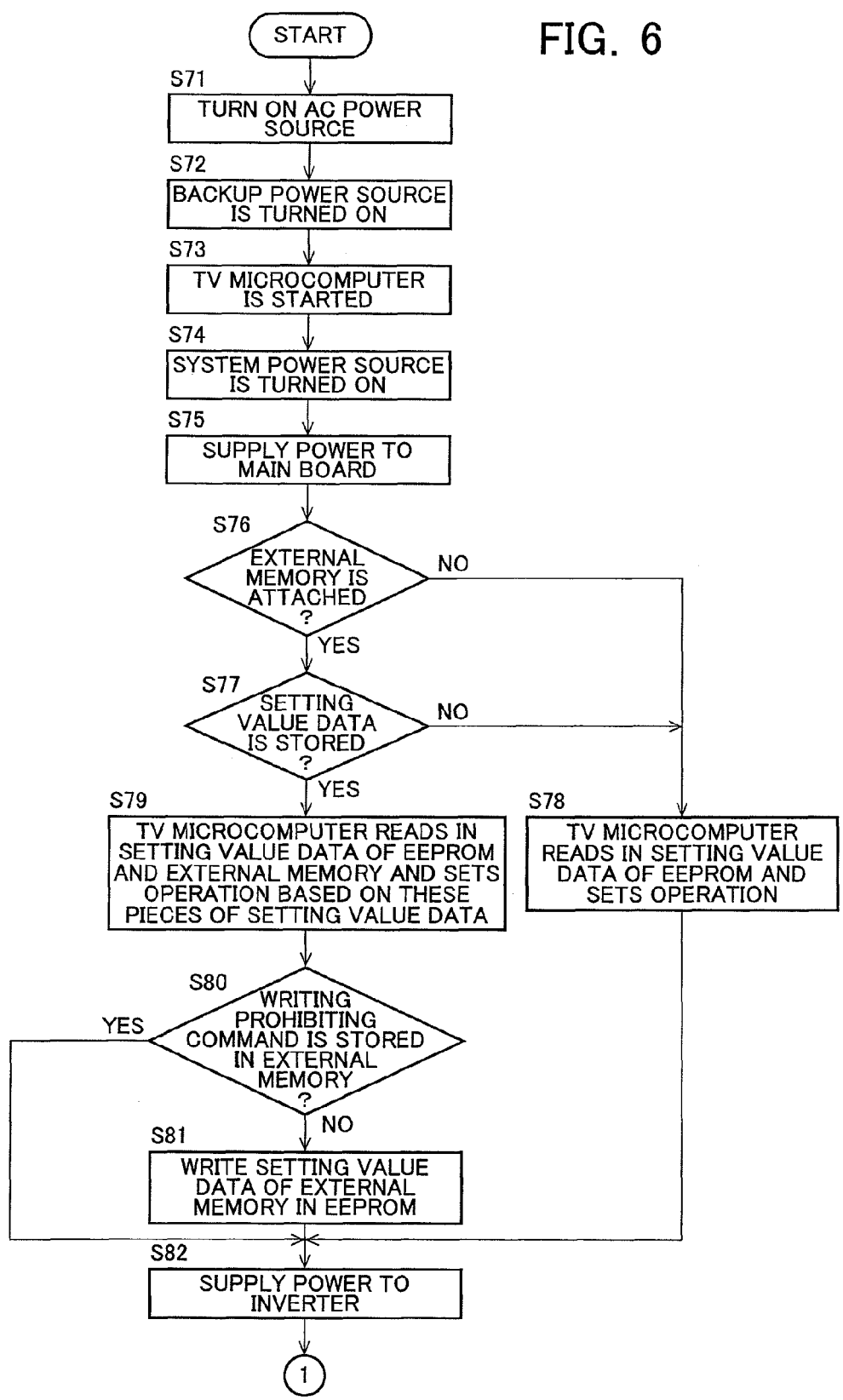
FIG. 6 is a flowchart for description of other example of the starting sequence of the display device according to the present invention.
Figure 7:
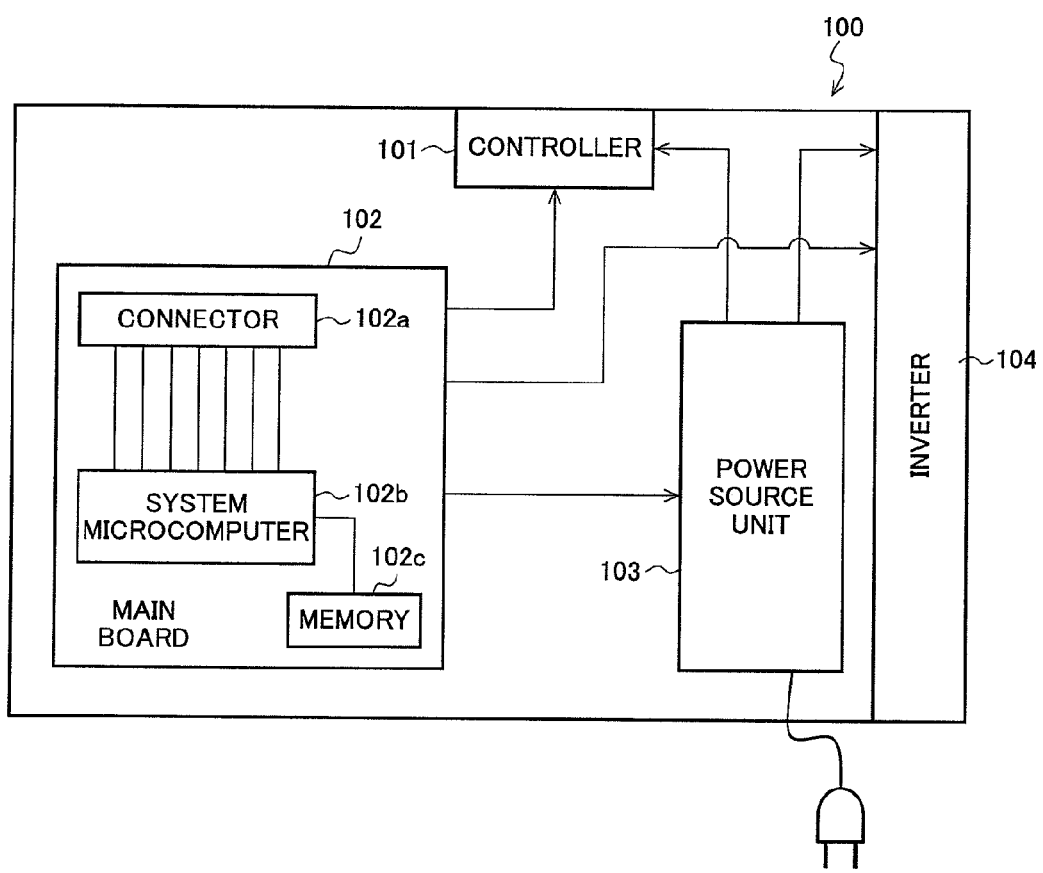
FIG. 7 is a block diagram of a main part configuration for description of an operation switching method of a system microcomputer in a conventional display device.
Figure 8:
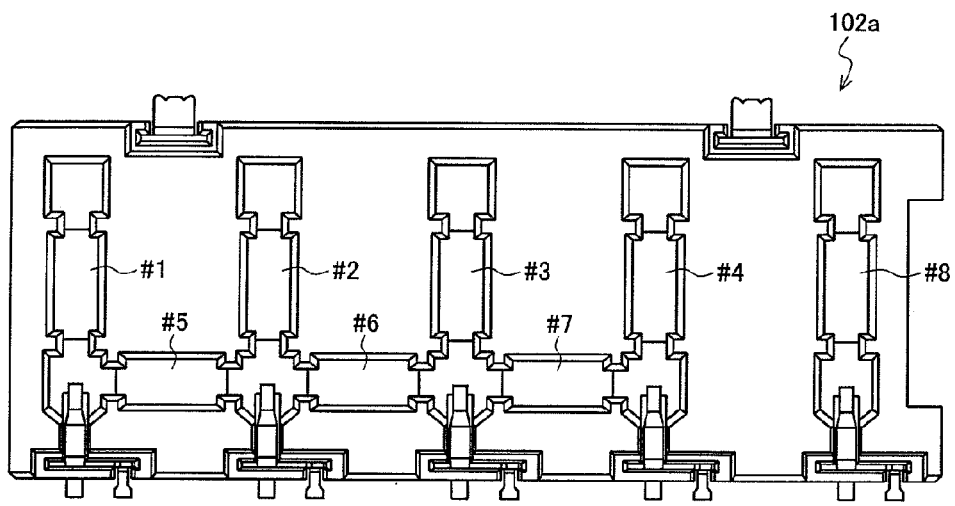
FIG. 8 is a diagram of an appearance configuration of a connector shown in FIG. 7.
Figure 8:
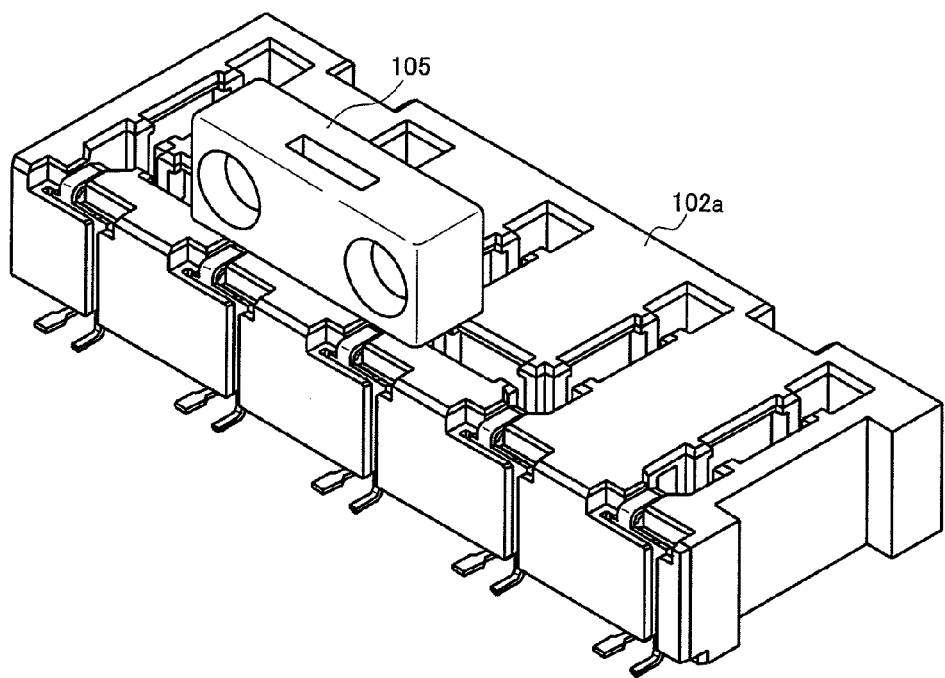

FIG. 6 is a flowchart for description of other example of the starting sequence of the display device 1 according to the present invention. This example, like the example of FIG. 5, will be described on the premise that the setting value data of the display device 1 identified by the flow of FIG. 2 is stored in the EEPROM 24 and further that the operation is set by the setting value data of the EEPROM 24. If the setting value data can be stored in the external memory 6 and the setting value data is stored in the external memory 6, then the TV microcomputer 22 sets the operation based on the setting value data of the external memory 6 and the setting value data of the EEPROM 24 and, after completion of the operation setting, writes the setting value data of the external memory 6 in the EEPROM 24. If the setting value data of the EEPROM 24 and the setting value data of the external memory 6 have a same setting item but different values, then the setting value data of the external memory 6 takes precedence over. If the setting value data of the EEPROM 24 and the setting value data of the external memory 6 have different setting items, then, in addition to the setting value data of the EEPROM 24, the setting value data of the external memory 6 is newly added.

For example, in the case of speaker parameter setting, etc., to meet users' demands, multiple pieces of setting value data are sometimes prepared even for a same model. One piece of setting value data (different from the setting value data of the EEPROM 24) out of these pieces of setting value data is stored in the external memory 6 and, with respect to this setting item, the operation can be set using the setting value data of the external memory 6 in place of the setting value data of the EEPROM 24. In the case of writing the setting value data of the external memory 6 in the EEPROM 24, if, as compared with the setting value data of the EEPROM 24, the setting value data of the external memory 6 has the same setting item but a different value, the setting value data of the EEPROM 24 is overwritten and if the setting value data of the external memory 6 has a different setting item, the setting value data of the external memory 6 is additionally written.

When the external memory 6 stores a command to prohibit writing the setting value data of the external memory 6 in the EEPROM 24, the TV microcomputer 22 prohibits writing the setting value data of the external memory 6 in the EEPROM 24 according to the command. In this case, the display device 1 is caused to temporarily operate by the setting value data of the external memory 6 so that the user or the worker can confirm the condition of the audio output, etc., of the display device 1. Since the setting value data of the external memory 6 will never be written to the EEPROM 24, the operation is set by the setting value data of the EEPROM 24 rather than the setting value data of the external memory 6, at the time of next starting. Since the processing of steps S71 to S75 of this example is the same as the processing of steps S1 to S5 of FIG. 2, the description thereof is omitted.

In FIG. 6, at step S76, if the CPU 21 of the display device 1 determines that the external memory 6 is attached (in the case of YES), then the CPU 21 determines if the setting value data is stored in the external memory (step S77). If the CPU 21 determines that the external memory 6 is not attached (in the case of NO), then the TV microcomputer 22 reads in the setting value data of the EEPROM 24 and sets the operation accordingly (step S78).

Then, at step S77, if it is determined that the setting value data is stored in the external memory 6 (in the case of YES), then the TV microcomputer 22 reads in the setting value data of the EEPROM 24 and the external memory 6 and sets the operation based on these pieces of setting value data (step S79). If it is determined that the setting value data is not stored in the external memory 6 (in the case of NO), then the flow goes to step S78.

Then, the CPU 21 determines if the external memory 6 stores the command to prohibit writing (step S80) and if the CPU determines that the external memory 6 does not store the command to prohibit writing (in the case of NO), then the flow goes to step S81, where TV microcomputer 22 writes the setting value data of the external memory 6 in the EEPROM 24. At step S80, if the CPU 21 determines that the external memory 6 stores the command to prohibit writing (in the case of YES), then goes to step S82 without writing in the EEPROM 24.

With the command to prohibit writing stored in the external memory 6, the setting value data of the external memory 6 will never be written in the EEPROM 24. For this reason, at the time of the next starting of the display device 1, the setting value data of the EEPROM 24 is used as it is and the user can watch the display device 1 based on the setting by the setting value data of the EEPROM 24 rather than the setting value data of the external memory 6. When the user or the worker judges that desired setting can be obtained by the setting value data of the external memory 6, the setting value data of the external memory 6 can be written in the EEPROM 24 by not storing the command in the external memory 6.

EXPLANATION OF REFERENCE NUMERALS

1 . . . display device, 2 . . . main board, 3 . . . controller board, 4 . . . power source unit, 5 . . . liquid crystal panel, 6 . . . external memory, 21 . . . CPU, 22 . . . TV (system) microcomputer, 23 . . . external memory I/F, 24 . . . EEPROM, 31 . . . controller IC, 41 . . . backup power source, 42 . . . system power source, 43 . . . controller IC power source, 51 . . . inverter

The invention claimed is:
1. A display device comprising:
a circuit board commonalized for various models;
a memory portion; and
a system microcomputer disposed on the circuit board and storing setting value data of each of the various models, wherein
the circuit board comprises:
an external memory interface to which an external memory storing model identification information of the display device is detachably attached; and
a model identification information reading portion that reads out the model identification information of the display device from the external memory,
the memory portion stores the model identification information of the display device read out from the external memory,
the system microcomputer, based on the model identification information of the display device read out from the external memory, identifies the setting value data of the display device out of the setting value data of the various models and switches operation by the identified setting value data, and wherein
the system microcomputer, at the time of starting thereof, determines if the model identification information of the display device is stored in the memory portion, and if it is determined that the model identification information of the display device is not stored in the memory portion, the model identification information reading portion reads out the model identification information of the display device from the external memory.
2. The display device as defined in claim 1, wherein
the memory portion further stores the setting value data of the display device identified out of the setting value data of the various models.
3. The display device as defined in claim 1, further comprising:
a power supplying portion that supplies power only to the circuit board at the time of starting the display device, wherein
the power supplying portion supplies power to circuit boards other than the circuit board after the system microcomputer switches operation.
4. The display device as defined in claim 1, wherein
the model identification information reading portion, at the time of starting thereof, determines if the model identification information of the display device is stored in the external memory, and if it is determined that the model identification information of the display device is stored in the external memory, writes the model identification information of the display device read out from the external memory over the model identification information of the display device stored in the memory portion.
5. The display device as defined in claim 1, wherein
the model identification information of the display device includes the model number and the screen size of the display device.
6. The display device as defined in claim 2, wherein
in a case where the external memory stores a command instructing to copy the setting value data of the memory portion to the external memory, the system microcomputer copies the setting value data of the memory portion to the external memory according to the command and thereafter stops its operation.
7. The display device as defined in claim 2, wherein
in a case where the external memory stores the setting value data, the system microcomputer switches operation by the setting value data of the memory portion and the setting value data of the external memory and thereafter writes the setting value data of the external memory in the memory portion.
8. A display device comprising:
a circuit board commonalized for various models;
a memory portion; and
a system microcomputer disposed on the circuit board and storing setting value data of each of the various models, wherein
the circuit board comprises:
an external memory interface to which an external memory storing model identification information of the display device is detachably attached; and
a model identification information reading portion that reads out the model identification information of the display device from the external memory,
the memory portion stores the model identification information of the display device read out from the external memory, and stores the setting value data of the display device identified out of the setting value data of the various models,
the system microcomputer, based on the model identification information of the display device read out from the external memory, identifies the setting value data of the display device out of the setting value data of the various models and switches operation by the identified setting value data, and wherein
in a case where the external memory stores the setting value data, the system microcomputer switches operation by the setting value data of the memory portion and the setting value data of the external memory and thereafter writes the setting value data of the external memory in the memory portion.
9. The display device as defined in claim 8, wherein
the setting value data of the memory portion and the setting value data of the external memory differ.
10. A television receiver comprising the display device as defined in claim 1.
11. A starting method of a display device comprising a circuit board commonalized for various models, a memory portion, a system microcomputer disposed on the circuit board and storing setting value data of each of the various models, and an external memory interface disposed on the circuit board, the method comprising the steps of:

supplying power only to the circuit board at the time of starting the display device;

reading out model identification information of the display device from an external memory detachably attached to the external memory interface;

storing, in the memory portion, the model identification information of the display device read out from the external memory;

identifying the setting value data of the display device out of the setting value data of the various models, based on the read-out model identification information of the display device;

switching operation of the system microcomputer by the identified setting value data of the display device;

supplying power to circuit boards other than the circuit board after switching the operation of the system microcomputer;

at the time of starting the display device, determining if the model identification information of the display device is stored in the memory portion; and in response to determining that the model identification information of the display device is not stored in the memory portion, reading out the model identification information of the display device from the external memory.

12. The starting method as defined in claim 11, further comprising the step of:

storing, in the memory portion, the setting value data of the display device identified out of the setting value data of the various models.

13. The starting method as defined in claim 11, further comprising the steps of:

at the time of starting the display device, determining if the model identification information of the display device is stored in the external memory; and in response to determining that the model identification information of the display device is stored in the external memory, writing the model identification information of the display device read out from the external memory over the model identification information of the display device stored in the memory portion.

14. The starting method as defined in claim 11, wherein the model identification information of the display device includes the model number and the screen size of the display device.

15. The starting method as defined in claim 11, further comprising the steps of:

in a case where the external memory stores a command instructing to copy the setting value data of the memory portion to the external memory, copying the setting value data of the memory portion to the external memory according to the command; and stopping operation of the external memory after the copying of the setting value data thereto.

16. The starting method as defined in claim 11, further comprising the steps of:

in a case where the external memory stores the setting value data, switching the operation of the system microcomputer by the setting value data of the memory portion and the setting value data of the external memory; and writing the setting value data of the external memory in the memory portion.

17. A display device comprising:
a circuit board commonalized for various models;
a memory portion; and
a system microcomputer disposed on the circuit board and storing setting value data of each of the various models, wherein the circuit board comprises:
an external memory interface to which an external memory storing model identification information of the display device is detachably attached; and
a model identification information reading portion that reads out the model identification information of the display device from the external memory, the memory portion stores the model identification information of the display device read out from the external memory, and stores the setting value data of the display device identified out of the setting value data of the various models, the system microcomputer, based on the model identification information of the display device read out from the external memory, identifies the setting value data of the display device out of the setting value data of the various models and switches operation by the identified setting value data, and wherein in a case where the external memory stores a command instructing to copy the setting value data of the memory portion to the external memory, the system microcomputer copies the setting value data of the memory portion to the external memory according to the command and thereafter stops its operation.

18. The display device as defined in claim 8, wherein
in a case where the external memory stores a command to prohibit writing the setting value data of the external memory in the memory portion, the system microcomputer prohibits writing in the memory portion according to the command.

19. A starting method of a display device comprising a circuit board commonalized for various models, a memory portion, a system microcomputer disposed on the circuit board and storing setting value data of each of the various models, and an external memory interface disposed on the circuit board, the method comprising the steps of:

supplying power only to the circuit board at the time of starting the display device;

reading out model identification information of the display device from an external memory detachably attached to the external memory interface;

storing, in the memory portion, the model identification information of the display device read out from the external memory;

identifying the setting value data of the display device out of the setting value data of the various models, based on the read-out model identification information of the display device;

switching operation of the system microcomputer by the identified setting value data of the display device;

supplying power to circuit boards other than the circuit board after switching the operation of the system microcomputer;

in a case where the external memory stores a command instructing to copy the setting value data of the memory portion to the external memory, copying the setting value data of the memory portion to the external memory according to the command; and stopping operation of the external memory after the copying of the setting value data thereto.

20. A starting method of a display device comprising a circuit board commonalized for various models, a memory portion, a system microcomputer disposed on the circuit board and storing setting value data of each of the various models, and an external memory interface disposed on the circuit board, the method comprising the steps of:
- supplying power only to the circuit board at the time of starting the display device;
- reading out model identification information of the display device from an external memory detachably attached to the external memory interface;
- storing, in the memory portion, the model identification information of the display device read out from the external memory;
- identifying the setting value data of the display device out of the setting value data of the various models, based on the read-out model identification information of the display device;
- switching operation of the system microcomputer by the identified setting value data of the display device;
- supplying power to circuit boards other than the circuit board after switching the operation of the system microcomputer;
- in a case where the external memory stores the setting value data, switching the operation of the system microcomputer by the setting value data of the memory portion and the setting value data of the external memory; and
- writing the setting value data of the external memory in the memory portion.

* * * * *